United States Patent
Lee

(10) Patent No.: US 7,375,255 B2
(45) Date of Patent: May 20, 2008

(54) RUBBER TIRE TO ENERGY PYROLYSIS SYSTEM AND METHOD THEREOF

(76) Inventor: Ernest Lee, 1006 Holiday Dr., West Covina, CA (US) 91791

( * ) Notice: Subject to any disclaimer, the term of this patent is extended or adjusted under 35 U.S.C. 154(b) by 458 days.

(21) Appl. No.: 11/083,703

(22) Filed: Mar. 18, 2005

(65) Prior Publication Data

US 2006/0211899 A1    Sep. 21, 2006

(51) Int. Cl.
  *C07C 1/00*    (2006.01)
  *B30B 11/22*   (2006.01)
  *B30B 7/04*    (2006.01)
  *C10B 9/00*    (2006.01)

(52) U.S. Cl. .......................... 585/241; 202/89; 100/41; 100/42

(58) Field of Classification Search ................ 585/241; 202/117; 100/41–51
    See application file for complete search history.

(56) References Cited

U.S. PATENT DOCUMENTS

| | | | | |
|---|---|---|---|---|
| 4,672,006 A | * | 6/1987 | McGraw | 428/528 |
| 6,659,025 B2 | * | 12/2003 | Yu | 110/341 |
| 6,666,955 B1 | * | 12/2003 | Bissell | 202/99 |
| 2002/0072640 A1 | * | 6/2002 | Nicholas et al. | 585/241 |
| 2003/0109761 A1 | * | 6/2003 | Suominen | 585/241 |

* cited by examiner

*Primary Examiner*—Walter D. Griffin
*Assistant Examiner*—Lessanework T Seifu
(74) *Attorney, Agent, or Firm*—Raymond Y. Chan; David and Raymond Patent Group

(57) ABSTRACT

The present invention provides a pyrolysis system and method thereof which are capable of converting an entire rubber tire into several energy resources in an environmentally-friendly manner. The system includes a tire transporting unit, a waste to energy conversion unit, and a energy collection unit. The waste to energy conversion unit includes a conversion housing having a reaction chamber for receiving the rubber tire for pyrolysis processing to decompose the rubber tire into fuel oil, methane gas and carbon black, while metal wire from the rubber tire are resided for recycling use.

9 Claims, 3 Drawing Sheets

RUBBER TIRE TO ENERGY PYROLYSIS SYSTEM AND METHOD THEREOF

BACKGROUND OF THE PRESENT INVENTION

1. Field of Invention

The present invention relates to a waste processing system and the method thereof, and more particularly to a pyrolysis system and method thereof which are capable of converting an entire rubber tire into several energy resources in an environmentally-friendly manner.

2. Description of Related Arts

Trash processing has become one of the most pressing problems for almost all developed countries. There are two conventional methods in treating trash, first, trash is transported to specific plants for burning, second, trash of appropriate categories is transported to certain landfill zones for landfill.

One particularly difficult issue of trash processing is how to deal with used rubber tires. According to the California Integrated Waste Management Board Report, people in California wear out roughly 28 million tires per year. Across the country, there are altogether 240 million old tires which are replaced each year. Thus, one can see the huge amount of used rubber tires in the US.

Given the huge demand of motor vehicles, the amount of dumped rubber tires are indeed tremendous. The above-mentioned conventional methods, such as burning and landfill, have been proven to be unsatisfactory. For example, burning of dumped rubber tires releases huge amount of pollutants which inevitably increases the problem of air pollution in the region.

Referring to the burning processing, as a matter of conventional practices, dumped rubber tires are first shredded before burning. This has the advantage of easy handling of the waste materials. However, it is almost impossible to effectively recycle those useful substances contained in the rubber tires. For instances, once the rubber tires have been shredded, such useful substances as steel wire are as well shredded. This makes engineers very difficult to recycle those shredded steel wires into high quality materials for other purposes.

Referring to the landfill method, it may temporarily resolve the problem of trash processing. However, as the amount of garbage and rubber tires are ever-increasing, there is simply not enough land for being filled with garbage. As land is one of the most important forms of property in any developed society like the US, this by no means an efficient and ideal way of processing garbage, including rubber tires. Moreover, it is important to point out that most landfill garbage is meant to be easily degradable. The fact that rubber tires are not easily degradable means that they are even not suitable for landfill.

As a result, one may appreciate that the conventional treatment method of dumped rubber tires are expensive, inefficient, and produces a substantial amount of pollutants which can seriously pollute the environment.

SUMMARY OF THE PRESENT INVENTION

A main object of the present invention is to provide a method of processing a rubber tire which is capable of converting a rubber tire in an entire piece into several energy resources in an environmentally-friendly manner.

Another object of the present invention is to provide a method of processing a rubber tire using pyrolysis process to decompose the rubber tire into carbon black, petroleum, methane gas, and steel wire. In other words, the rubber tire is converted into energy resources and steel wire for recycling use.

Another object of the present invention is to provide a method of processing a rubber tire which does not involve shredding thereof so as to perverse the highest quality of recycling resources when the rubber tire is decomposed. For example, the steel wire is preserved to the fullest extent so as to maximize the range of application of the recycled steel wire and minimize the cost of handling such recycled resources.

Another object of the present invention is to provide a method of processing a rubber tire which does not release pollutant to the ambient atmosphere. In other words, the present invention does not resolve the problem of dumped rubber tire at the cost of deteriorating environment.

Another object of the present invention is to provide a pyrolysis system which is which is capable of converting a rubber tire in an entire piece into several energy resources in an environmentally-friendly manner.

Another object of the present invention is to provide a pyrolysis system which is easy to operate, efficient, and reliable.

Another object of the present invention is to provide a pyrolysis system which is adapted for converting used rubber tires into energy resources and metallic residuals in a virtually pollution-free manner, so as to promote environmentally-friendly practices among the industry.

Accordingly, in order to achieve the above objects, the present invention provides a method of processing a rubber tire which comprises a rubber casing and a metal wire embedded therein, wherein the method comprises the steps of:

(a) feeding the rubber tire into a reaction chamber having a deoxygenated environment, wherein the rubber tire is served in a whole piece manner without shredding the rubber tire in pieces;

(b) adding a catalyst into the reaction chamber to mix with the rubber tire; and (c) pyrolysing the rubber tire in the reaction chamber to vaporize the rubber tire such that the rubber casing of the rubber tire is decomposed into fuel oil, methane gas and carbon black to be collected as an energy source while the metal wire is residue for recycling use.

Moreover, the present invention provides a pyrolysis system for a rubber tire which comprises a rubber casing and a metal wire embedded therein, comprising:

a tire transporting unit adapted for transporting the rubber tire in a whole piece manner without shredding the rubber tire in pieces;

a waste to energy conversion unit comprising a conversion housing having a reaction chamber for receiving the rubber tire from the tire transporting unit, and a pyrolysis processor for pyrolysis processing the rubber tire in the reaction chamber to decompose the rubber casing of the rubber tire into fuel oil, methane gas and carbon black so as to remove the metal wire from the rubber casing; and an energy collection unit communicated with the waste to energy conversion unit to collect the fuel oil, the methane gas and the carbon black as an energy source and the metal wire for recycling use.

These and other objectives, features, and advantages of the present invention will become apparent from the following detailed description, the accompanying drawings, and the appended claims.

DETAILED DESCRIPTION OF THE PREFERRED EMBODIMENT

Figure 1:
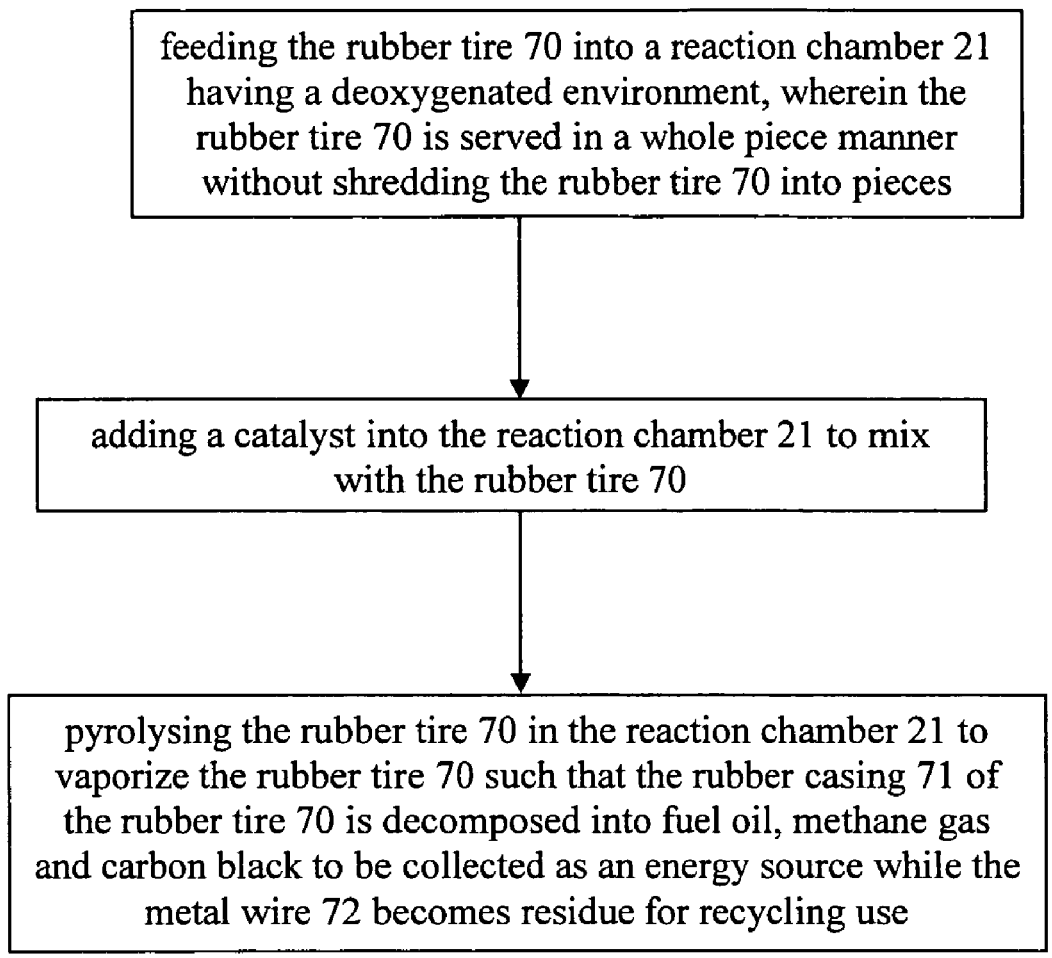
FIG. 1 is a flow diagram of the method of processing a rubber tire according to a preferred embodiment of the present invention.

Referring to FIG. 1 of the drawings, a method of processing a rubber tire 70 which comprises a rubber casing 71 and a metal wire 72 embedded therein is illustrated. The method comprises the steps of:

(a) feeding the rubber tire 70 into a reaction chamber 21 having a deoxygenated environment, wherein the rubber tire 70 is served in a whole piece manner without shredding the rubber tire 70 into pieces;

(b) adding a catalyst into the reaction chamber 21 to mix with the rubber tire 70; and (c) pyrolysing the rubber tire 70 in the reaction chamber 21 to vaporize the rubber tire 70 such that the rubber casing 71 of the rubber tire 70 is decomposed into fuel oil, methane gas and carbon black to be collected as an energy source while the metal wire 72 becomes residue for recycling use.

The method of processing the rubber tire 70 is meant to be utilized in a pyrolysis system. According to the preferred embodiment of the present invention, in order to ensure the highest effectiveness of the rubber tire processing method, in step (a), each of the rubber tires 70 is laid flat on a transport device to be transported to the reaction chamber at a predetermined rate.

The reason is that the method of processing the rubber tire 70 is expected to handle a plurality of rubber tires 70 collected from rubber tires collection stations. Thus, in order to ensure effective pyrolysis process within the reaction chamber 21, and facilitate easy transportation of the rubber tires 70, each of the rubber tires 70 should be laid down to prevent them from being accidentally displaced or falling out of the transport device. The transport device is preferably embodied as a conveying belt wherein the rubber tire 70 is laid thereon for being transported into the reaction chamber 21.

Figure 2:
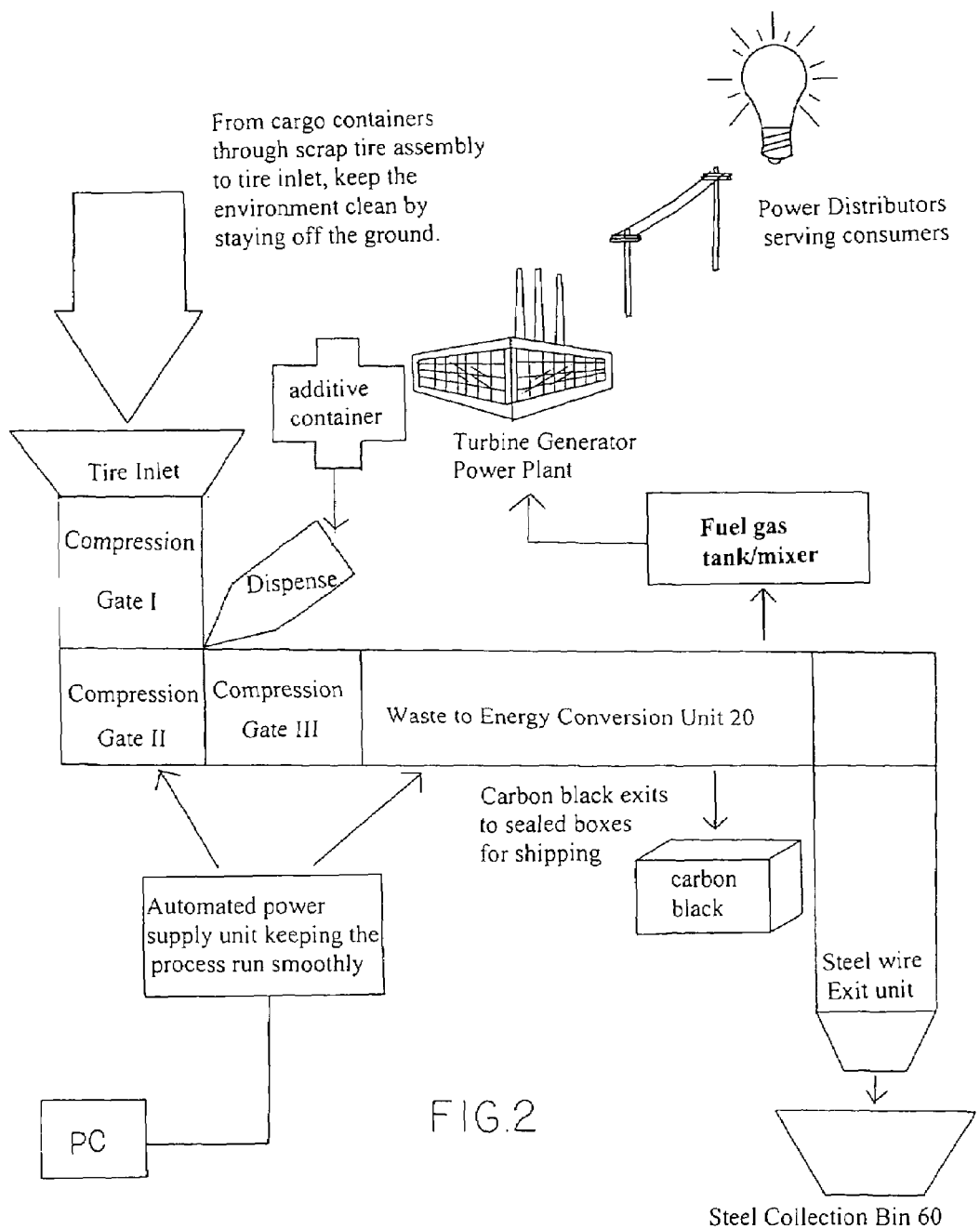
FIG. 2 is a block diagram of the pyrolysis system employing the above method of processing the rubber tire according to the above preferred embodiment of the present invention.

Referring to FIG. 1 to FIG. 2 of the drawings, in order to ensure minimization of the size of the rubber tire 70 before the pyrolysing step, step (a) further comprises a step (a.1) of compressing each of the rubber tires 70 in a compression gate 30 without shredding of the rubber tire 70 so as to reduce a physical size thereof before entering into the reaction chamber 21.

However, it is worth mentioning that the compression is not performed in one-go, rather, the rubber tire 70 is compressed in an incremental basis via the plurality of compression gates 30. Thus, step (a.1) comprises a step (a.1.1) of incrementally applying a predetermined pressure to the rubber tire 70 so as to incrementally compress the rubber tire 70 into a predetermined minimal size for optimal pyrolysis process as mentioned in step (c) above.

Figure 3:
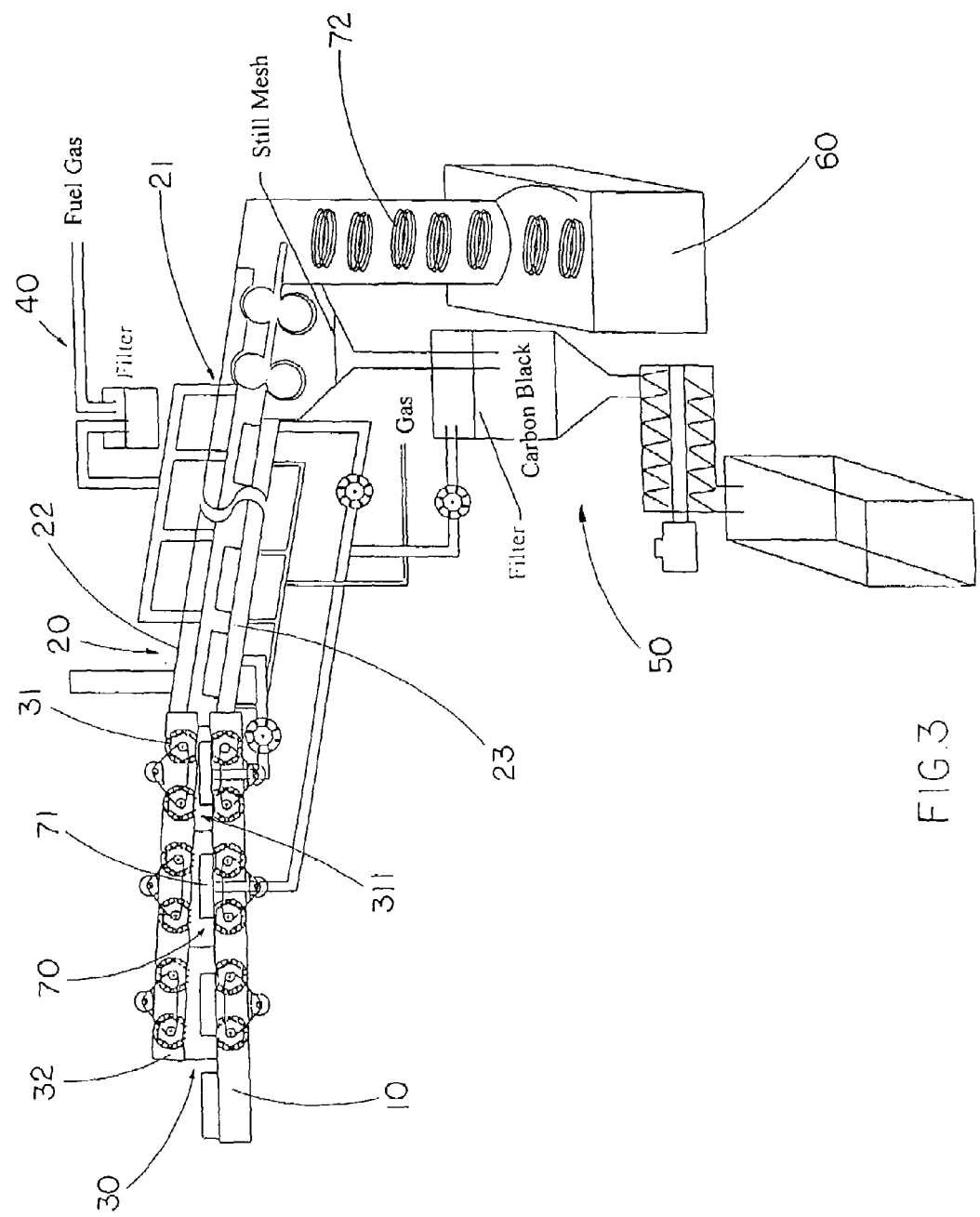
FIG. 3 is a schematic diagram of the pyrolysis system employing the above method of processing the rubber tire according to the preferred embodiment of the present invention.

According to the preferred embodiment of the present invention, the rubber tire 70 is to be undergone three incremental squeezing procedures in three compression gates 30 for gradually reducing the size of the rubber tire 70. Referring to FIG. 2 to FIG. 3 of the drawings, step (a.1.1) comprises the steps of:

(a.1.1.1) pressurizing each of the compression gates 30 to a predetermined pressure which is larger than a pressure of the rubber tire 70;

(a.1.1.2) mechanically compressing the rubber tire 70 so as to squeeze the rubber tire 70 to a predetermined size.

According to the preferred embodiment of the present invention, the compression ratio for the rubber tire 70 is approximately 1:3, that is, the rubber size is arranged to be squeezed to be one-third of its original size.

Referring to FIG. 3 of the drawings, the mechanical compression as mentioned in step (a.1.1.1) is preferably accomplished by a plurality of compression rollers 31 alignedly mounted within the compression gates 30 in a spacedly apart manner to define a compression channel 311 for the rubber tire 70 to pass therethrough. Thus, a width of the compression channel 311 is slightly smaller than a height of the rubber tire 70 such that when the rubber tire 70 passes through the compression channel 311, a physical size of the rubber tire 70 is mechanically compressed at a predetermined degree so as to incrementally apply the pressure as mentioned in step (a.1.1.2) for incrementally squeezing the rubber tire 70 into a predetermined minimal size for optimal pyrolysis process as mentioned in step (c) above. Moreover, as mentioned earlier, the reaction chamber 21 must be kept at a deoxygenated environment, i.e. having no oxygen, so that when the rubber tire 70 is undergoing the pyrolysis process as mentioned in step (c), the rubber tire 70 is not to be incinerated, rather, it will be decomposed in the manner in step (c).

In order to enhance the effectiveness of the subsequent prolysis process, step (a) further comprises a step of vacuuming air in the compression gate 30 when each of the rubber tires 70 is compressed for preventing oxygen entering into the reaction chamber 21 so as to remain the deoxygenated environment thereof.

In step (b) above, the catalyst is utilized to ensure effective pyrolysis within the reaction chamber 21 so as to effectively and efficiently decompose the rubber tire 70 into the above-mentioned constituents.

Step (c) comprises the steps of:

(c.1) gradually increasing a temperature within the reaction chamber 21 in the deoxygenated environment until the rubber casing 71 of each of the rubber tires 70 is vaporized to form vaporized gas and the carbon black without incinerating the rubber tire, wherein the metal wire 72 becomes residue after the rubber casing 71 is vaporized;

(c.2) condensing the vaporized gas to extract the fuel oil therefrom while non-liquefied vapor gas becomes methane gas, wherein the vaporized gas is pumped out of the reaction chamber 21 into a distillation facility 40 for the vaporized gas condensing therewithin; and (c.3) individually collecting the fuel oil and the methane gas in the distillation facility 40, the carbon black in a vacuum apparatus that the carbon black is extracted out from the reaction chamber 21, and the residual metal wire 72 to a steel collection bin 60 for recycling use.

Referring to FIG. 3 of the drawings, it is important to point out that the reaction chamber 21 is located within a waste to energy conversion unit which is downwardly inclined from the compression gates 30 towards the end of the pyrolysis system. As a result, the rubber tire 70 is naturally guided by gravitational force to move from one end to another within the reaction chamber 21 so as to minimize the energy required for mechanically transporting the rubber tire 70 along the pyrolysis system. In other words, the present invention achieves the maximum effort of environmental protection, i.e. reduction of energy use.

Thus step (c.1) further comprising a step of guiding the compressed rubber tires 70 to slide from an input end of the reaction chamber 21 to an output end thereof, wherein the reaction chamber 21 is an elongated reaction channel supported in an inclined manner that each of the compressed rubber tires 70 is pushed towards the output end by the subsequent compressed rubber tire 70 and by gravity.

According to the preferred embodiment of the present invention, step (c.2) comprises the steps of:

(c.2.1) pumping the vaporized gas within the reaction chamber 21 into a distillation facility 40 where a predetermined amount of vaporized gas is condenses to form the oil fuel, and a predetermined amount of vaporized gas is cooled down to form the methane gas;

(c.2.2) extracting the carbon black from the reaction chamber 21 into a vacuum apparatus 50 after decomposition of the rubber tire 70; and (c.2.3) transporting the residual metal wire left in the reaction chamber 21 to a steel collection bin 60 for recycling use.

It is worth mentioning that the quality of the pyrolysis process depends upon the speed the rubber tire 70 is transported along the system and the temperature within the reaction chamber 21. By adjusting the speed and the temperature, the constituents produce by the rubber tire 70, i.e. the fuel oil, the methane gas, the carbon black as well as the residual metal wire will be of high quality and therefore suitable for further critical industrial use. As an illustration, the rubber tire 70 would be converted into, by percentage volume, approximately 36% of carbon, approximately 41% of fuel oil, approximately 12% of methane gas, and approximately 10% of metal wire.

Moreover, in step (c.3), the steel collection bin 60 is preferably positioned underneath the waste to energy conversion unit such that the residual metal wire, after transported from the reaction chamber, may be guided by gravity to fall into the steel collection bin 60 so as to further minimize the energy required for the transportation of the residual steel wire.

In order to further enhance the effectiveness of the present invention, the method of processing the rubber tire 70 further comprises a step prior to the step (a) of cleansing the rubber tire 70 to remove unwanted dirt sticking thereon. This step plays an important role in that unwanted dirt sticking onto the outer surface of the rubber tire 70 may affect the normal operation of the compression gates 30 as well as the waste to energy conversion unit.

Referring to FIG. 3 of the drawings, a pyrolysis system employing the above-mentioned method of processing a rubber tire 70 which comprises the rubber casing 71 and the metal wire 72 embedded thereon is illustrated, in which the pyrolysis system comprises a tire transporting unit 10, the waste to energy conversion unit 20, and an energy collection unit.

The tire transporting unit 10 is adapted for transporting the rubber tire 70 in a whole piece manner without shredding the rubber tire 70 in pieces.

The waste to energy conversion unit 20 comprises a conversion housing 22 having the reaction chamber 21 for receiving the rubber tire 70 from the tire transporting unit 10, and a pyrolysis processor 23 for pyrolysis processing the rubber tire 70 in the reaction chamber 21 to decompose the rubber casing 71 of the rubber tire 70 into fuel oil, methane gas and carbon black so as to remove the metal wire from the rubber casing 71.

The energy collection unit is communicated with the waste to energy conversion unit 20 to collect the fuel oil, the methane gas and the carbon black as an energy source and the metal wire for recycling use.

The tire transporting unit 10 is preferably embodied as a conveying belt device adapted for carrying the rubber tire 70 to accomplish the pyrolysis at a predetermined speed, and in a carefully controlled manner.

Moreover, the pyrolysis system further comprises a compression unit comprising at least one compression gate 30 communicating with the tire transporting unit 10 wherein the rubber tire 70 is first fed into the compression gate 30 before being transported to the waste to energy conversion unit. The pyrolysis system is preferably embodied as comprising three compression gates 30 for incrementally squeezing the rubber tire 70 into a predetermined size in three stages so as to ensure convenient and effective pyrolysis process taken place in the waste to energy conversion unit.

Each of the compression gates 30 has a predetermined compression room size that when each of the rubber tires 70 is guided into the compression gates 30, the rubber tire 70 is gradually compressed through the compression gates 30 with respect to the compression room sizes thereof.

Moreover, each of the compression gates 30 comprises a gate housing 32, a plurality of compression rotors 31 alignedly supported within the gate housing 32 in a spacedly apart manner to define a compression channel 311 between the compression rotors 31 wherein the rubber tire 70 is transported to pass through the compression channel 311 for being mechanically and incrementally squeezed into a predetermined physical size. It is therefore worth mentioning that a width of the compression channel 311 is slightly smaller than a corresponding height of the rubber tire 70 such that when the it is forced to pass through the compression channel 311, the physical size of the rubber tire 70 is squeezed to reduce for the next stage in the pyrolysis process.

Moreover, each of the compression gates 30 further comprises a pressurizing device 33 provided within the respective gate housing 32 for increasing an elevated pressure in the gate housing 32 so as to uniformly squeeze the rubber tire 70 by greater pressure within the gate housing 32.

The pyrolysis processor 23 of the waste to energy conversion unit 20 is adapted to increase the temperature of the rubber tire 70 within the reaction chamber 21 for decomposing the rubber tire 70 into the fuel oil, methane gas, carbon black while the metal wire is resided for recycling use. Therefore, the rubber tire 70 within the compression gates 30 are decomposed to form a vaporized gas containing a certain amount of fuel oil, a certain amount of methane gas, a certain amount of carbon black, while the metal wire is resided for recycling use.

Referring again to FIG. 3 of the drawings, the energy collection unit comprises a distillation facility 40 communicated with the reaction chamber 21 wherein the vaporized gas is pumped to pass through the distillation facility 40 in such a manner that a certain amount of vaporized gas is cooled down and condensed to form the fuel oil, a certain amount of uncondensed vaporized gas is cooled to form the methane gas. Moreover, the energy collection unit further comprises a vacuum apparatus 50 communicated with the reaction chamber 21 for extracting the carbon black from the reaction chamber 21 so as to collect it for energy resources. As a result, only the metal wire 72 is left in the reaction chamber 21 and is transported by the tire transporting unit 10 to exit the waste to energy conversion unit 20 and collected by a steel collection bin 60.

It is also important to point out that the waste to energy conversion unit 20 is positioned in a downwardly inclined manner so that the transportation of the rubber tire 70 within the reaction chamber 21 can be partially assisted by gravitational force so as to minimize the energy required for the operation of the present invention.

From the forgoing descriptions, it can be shown that the above-mentioned objects have been substantially achieved. The present invention effectively provides a method of processing the rubber tire 70 which is capable of converting the rubber tire 70 as an entire piece into several energy resources in an environmentally-friendly manner. Moreover, the present invention also successfully provides the pyrolysis system which is adapted to process the rubber tire 70 in accordance with the method mentioned.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of processing rubber tires each of which comprises a rubber casing and a metal wire embedded therein, comprising the steps of:
    (a) feeding said rubber tires into a reaction chamber having a deoxygenated environment, wherein each of said rubber tires is served in a whole piece manner without shredding said rubber tire in pieces into said reaction chamber one by one;
    (b) adding a catalyst into said reaction chamber to mix with said rubber tires; and
    (c) pyrolysing said rubber tires in said reaction chamber to vaporize said rubber tires such that said rubber casing of each of said rubber tires is decomposed into fuel oil, methane gas and carbon black to be collected as an energy source while said metal wire becomes residue for recycling use, wherein said step (c) comprises the steps of:
        (c.1) gradually increasing a temperature within said reaction chamber in said deoxygenated environment until said rubber casing of each of said rubber tires is vaporized to form vaporized gas and said carbon black without incinerating said rubber tire, wherein said metal wire becomes residue after said rubber casing is vaporized;
        (c.2) condensing said vaporized gas to extract said fuel oil therefrom while non-liquefied vapor gas becomes methane gas, wherein said vaporized gas is pumped out of said reaction chamber into a distillation facility for said vaporized gas condensing therewithin; and
        (c.3) individually collecting said fuel oil and said methane gas in said distillation facility, said carbon black in a vacuum apparatus that said carbon black is extracted out from said reaction chamber, and said residual metal wire to a steel collection bin for recycling use.

2. A method of processing rubber tires each of which comprises a rubber casing and a metal wire embedded therein, comprising the steps of:
    (a) feeding said rubber tires into a reaction chamber having a deoxygenated environment, wherein each of said rubber tires is served in a whole piece manner without shredding said rubber tire in pieces into said reaction chamber one by one;
    (b) adding a catalyst into said reaction chamber to mix with said rubber tires; and
    (c) pyrolysing said rubber tires in said reaction chamber to vaporize said rubber tires such that said rubber casing of each of said rubber tires is decomposed into fuel oil, methane gas and carbon black to be collected as an energy source while said metal wire becomes residue for recycling use, wherein each of said rubber tires is laid flat on a conveying belt to be transported to said reaction chamber at a predetermined rate, said step (a) further comprising a step of mechanically compressing each of said rubber tires in a plurality of compression gates without shredding of said rubber tire so as to reduce a physical size thereof before entering into said reaction chamber, and a step of vacuuming air in said compression gate when each of said rubber tires is compressed for preventing oxygen entering into said reaction chamber so as to remain said deoxygenated environment thereof, wherein each of said compression gates has a predetermined compression room size that when each of said rubber tires is guided into said compression gates, said rubber tire is gradually compressed through said compression gates with respect to said compression room sizes thereof, wherein said step (c) comprises the steps of:
        (c.1) gradually increasing a temperature within said reaction chamber in said deoxygenated environment until said rubber casing of each of said rubber tires is vaporized to form vaporized gas and said carbon black without incinerating said rubber tire, wherein said metal wire becomes residue after said rubber casing is vaporized;
        (c.2) condensing said vaporized gas to extract said fuel oil therefrom while non-liquefied vapor gas becomes methane gas, wherein said vaporized gas is pumped out of said reaction chamber into a distillation facility for said vaporized gas condensing therewithin; and
        (c.3) individually collecting said fuel oil and said methane gas in said distillation facility, said carbon black in a vacuum apparatus that said carbon black is extracted out from said reaction chamber, and said residual metal wire to a steel collection bin for recycling use.

3. The method as recited in claim 1, in step (c.1), further comprising a step of guiding said compressed rubber tires to slide from an input end of said reaction chamber to an output end thereof, wherein said reaction chamber is an elongated reaction channel supported in an inclined manner that each of said compressed rubber tires is pushed towards said output end by said subsequent compressed rubber tire and by gravity.

4. The method as recited in claim 2, in step (c.1), further comprising a step of guiding said compressed rubber tires to slide from an input end of said reaction chamber to an output end thereof, wherein said reaction chamber is an elongated reaction channel supported in an inclined manner that each of said compressed rubber tires is pushed towards said output end by said subsequent compressed rubber tire and by gravity.

5. The method as recited in claim 3, wherein in said step (c.3), said steel collection bin is positioned below said reaction chamber such that said metal wire is dropped into said steel collection bin by gravity.

6. The method as recited in claim 4, wherein in said step (c.3), said steel collection bin is positioned below said reaction chamber such that said metal wire is dropped into said steel collection bin by gravity.

7. The method, as recited in claim 1, further comprising a step prior to said step (a) of cleansing said rubber tire to remove unwanted dirt sticking thereon for preventing said unwanted dirt to affect said pyrolysis process in said step (c).

8. The method, as recited in claim 3, further comprising a step prior to said step (a) of cleansing said rubber tire to remove unwanted dirt sticking thereon for preventing said unwanted dirt to affect said pyrolysis process in said step (c).

9. The method, as recited in claim 4, further comprising a step prior to said step (a) of cleansing said rubber tire to remove unwanted dirt sticking thereon for preventing said unwanted dirt to affect said pyrolysis process in said step (c).

* * * * *